US012734686B2

(12) United States Patent
Yoshida

(10) Patent No.: US 12,734,686 B2
(45) Date of Patent: Sep. 15, 2026

(54) INFORMATION PROCESSING APPARATUS, INFORMATION PROCESSING METHOD, AND PROGRAM

(71) Applicant: NEC Corporation, Tokyo (JP)

(72) Inventor: Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 18/382,663

(22) Filed: Oct. 23, 2023

(65) Prior Publication Data

US 2024/0149444 A1 May 9, 2024

(30) Foreign Application Priority Data

Nov. 4, 2022 (JP) ................................ 2022-177192

(51) Int. Cl.
*B25J 9/16* (2006.01)

(52) U.S. Cl.
CPC .................................... *B25J 9/163* (2013.01)

(58) Field of Classification Search
CPC .... B25J 9/163; H04L 41/0806; H04L 41/145; G05B 17/02
See application file for complete search history.

(56) References Cited

U.S. PATENT DOCUMENTS

2011/0029469 A1 2/2011 Yamada
2021/0014144 A1* 1/2021 Iwai ........................ H04L 43/04

FOREIGN PATENT DOCUMENTS

JP 2006-258977 A 9/2006
JP 2011-034177 A 2/2011
JP 2018-124963 A 8/2018
JP 2022-151129 A 10/2022
WO 2023/074800 A1 5/2023

OTHER PUBLICATIONS

Japanese Office Action for JP Application No. 2022-177192, mailed on Jul. 28, 2026 with English Translation.

* cited by examiner

*Primary Examiner* — Basil T. Jos
(74) *Attorney, Agent, or Firm* — Sughrue Mion, PLLC

(57) ABSTRACT

An information processing apparatus 100 according to the present disclosure includes an acquisition unit 121 configured to acquire a communication condition of a communication route leading to a provision destination to which probability distribution data is provided, a determination unit 122 configured to determine a mixture number of a plurality of known distributions to be used when the probability distribution data is approximated based on the communication condition, and a generation unit 123 configured to generate a mixture model approximating the probability distribution data by mixing the distributions according to the determined mixture number.

14 Claims, 5 Drawing Sheets

100
INFORMATION PROCESSING APPARATUS
101
CPU
108
INPUT/OUTPUT INTERFACE
107
COMMUNICATION INTERFACE
BUS
109
105
STORAGE DEVICE
104
PROGRAM GROUP
103
RAM
102
ROM
106
DRIVE DEVICE
110
111

INFORMATION PROCESSING APPARATUS, INFORMATION PROCESSING METHOD, AND PROGRAM

CROSS-REFERENCE TO RELATED APPLICATIONS

This application is based upon and claims the benefit of priority from Japanese Patent Application No. 2022-177192 filed in Japan on Nov. 4, 2022, the disclosure of which is incorporated herein in its entirety by reference.

TECHNICAL FIELD

The present disclosure relates to an information processing apparatus, an information processing method, and a program.

BACKGROUND ART

Digital twins for observing and modeling systems in the real world have been subjected to a demand for a probabilistic digital twin, which introduces a probabilistic disturbance such as an observation error, a control error, and a modeling error, and reproduces the system as a probabilistic system in a digital space. In this case, such a digital twin is supposed to handle the state of the system as a probability distribution and provide probability distribution data from the probabilistic digital twin side to the system side in the real world.

Now, when the probability distribution data is provided from the probabilistic digital twin side to the system side in the real world as described above, the probability distribution data is supposed to be transferred via a communication network. At this time, if the probability distribution data is expressed by a known probability distribution, the transferred data amount can be reduced by utilizing a parameter of this probability distribution. Especially, as discussed in Patent Literature 1, the probability distribution data may be expressed as a Gaussian mixture model constructed based on a plurality of Gaussian distributions as basis functions, and the probability distribution data can also be transferred with the data amount thereof reduced even in such a case. As one example, in Patent Literature 1, a Kullback-Leibler divergence (KLD) is calculated and the original probability model is approximated by the Gaussian mixture model.

CITATION LIST

Patent Literature

[Patent Literature 1] Japanese Patent Application Laid-Open No. 2006-258977

SUMMARY OF INVENTION

Technical Problem

However, a problem arises in that the data cannot be reliably transferred while the accuracy of the mixture model is improved when the data is transferred with the probability distribution data expressed by the mixture model as described above. For example, the mixture model can more closely approximate the original probability distribution data as the number of mixed distributions increases, but this leads to an increase in the volume of the transferred data and may result in a transfer failure.

In light thereof, an object of the present disclosure is to provide an information processing apparatus capable of solving such a problem that data cannot be reliably transferred while the accuracy is improved when probability distribution data is transferred in the form of a mixture model constructed by mixing a plurality of distributions, which is the above-described problem.

Solution to Problem

An information processing apparatus according to one aspect of the present disclosure includes:

- an acquisition unit configured to acquire a communication condition of a communication route leading to a provision destination to which probability distribution data is provided;
- a determination unit configured to determine a mixture number of a plurality of known distributions to be used when the probability distribution data is approximated based on the communication condition; and
- a generation unit configured to generate a mixture model approximating the probability distribution data by mixing the distributions according to the determined mixture number.

Further, an information processing method according to one aspect of the present disclosure includes:

- acquiring a communication condition of a communication route leading to a provision destination to which probability distribution data is provided;
- determining a mixture number of a plurality of known distributions to be used when the probability distribution data is approximated based on the communication condition; and
- generating a mixture model approximating the probability distribution data by mixing the distributions according to the determined mixture number.

Further, a program according to one aspect of the present disclosure includes instructions for causing a computer to execute processing to:

- acquire a communication condition of a communication route leading to a provision destination to which probability distribution data is provided;
- determine a mixture number of a plurality of known distributions to be used when the probability distribution data is approximated based on the communication condition; and
- generate a mixture model approximating the probability distribution data by mixing the distributions according to the determined mixture number.

Advantageous Effects of Invention

By being configured in this manner, the present disclosure allows the data to be reliably transferred while the accuracy is improved when the probability distribution data is transferred in the form of the mixture model constructed by mixing the plurality of distributions.

DESCRIPTION OF EMBODIMENTS

First Exemplary Embodiment

Figure 1:
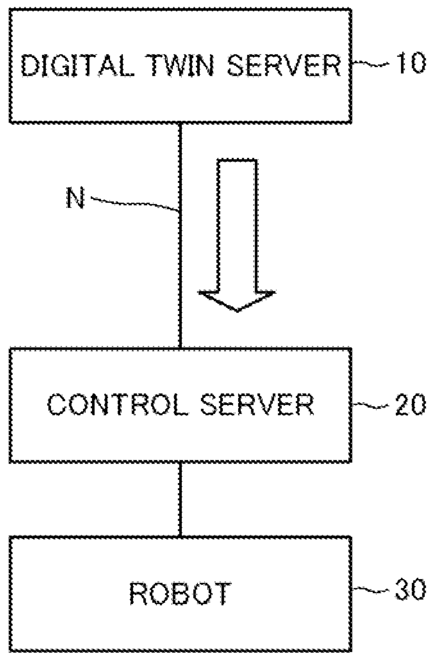
FIG. 1 is a block diagram illustrating the overall configuration of a digital twin system according to a first exemplary embodiment of the present disclosure.
Figure 2:
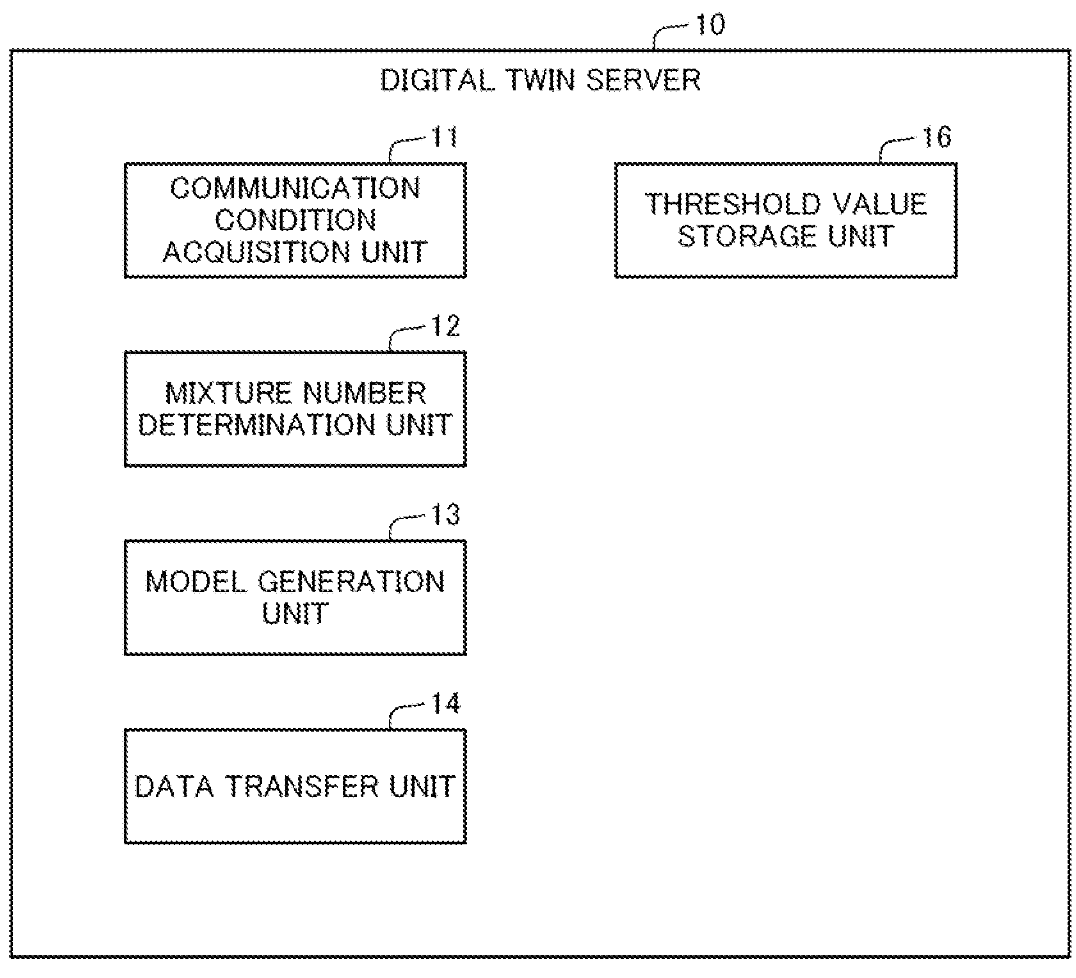
FIG. 2 is a block diagram illustrating the configuration of a digital twin server disclosed in FIG. 1.
Figure 3:
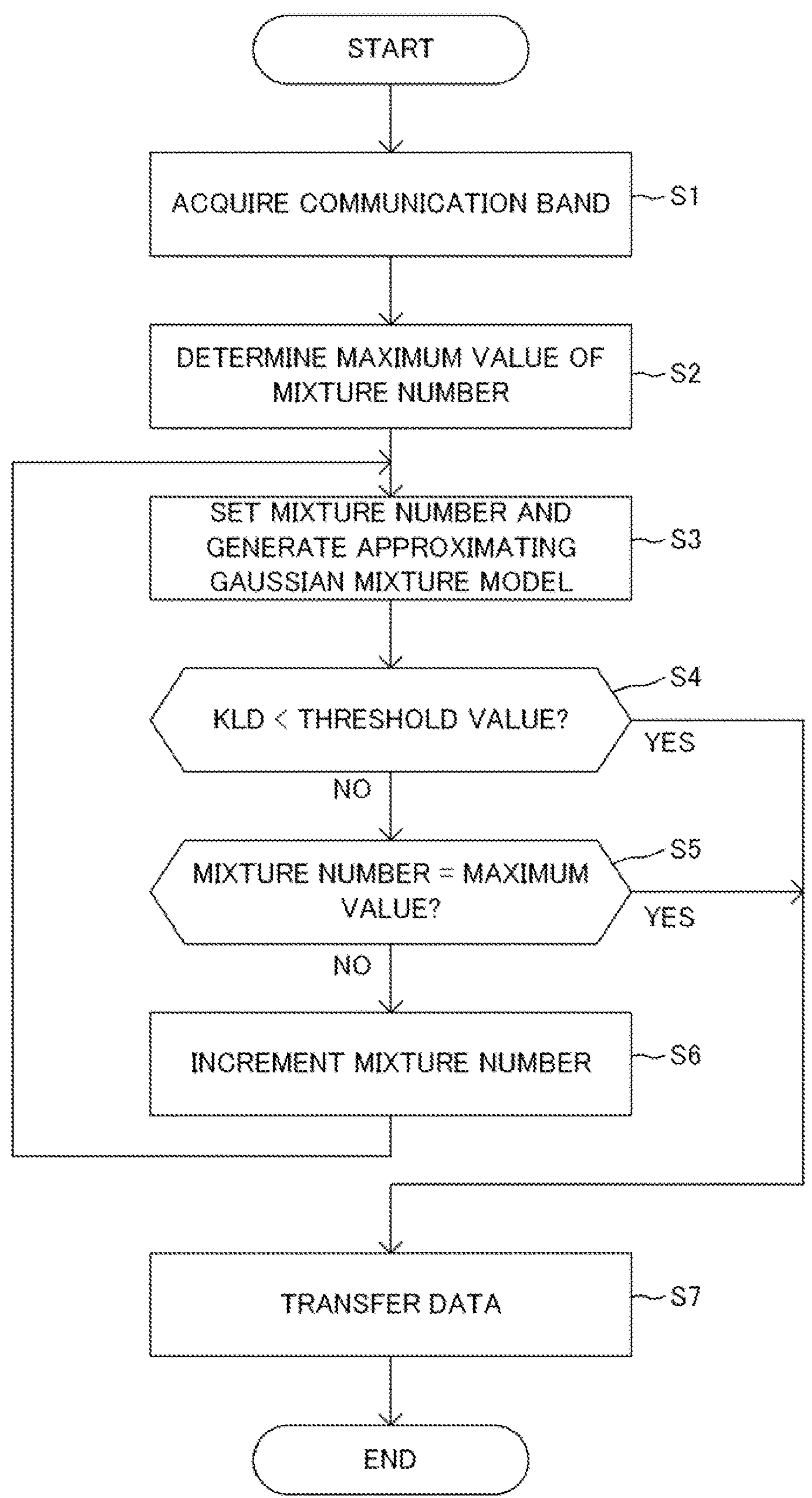
FIG. 3 is a flowchart illustrating the operation of the digital twin server disclosed in FIG. 1.

A first exemplary embodiment of the present disclosure will be described with reference to FIGS. 1 to 3. FIGS. 1 and 2 are diagrams for illustrating the configuration of a digital twin system, and FIG. 3 is a diagram for illustrating a processing operation of the digital twin system.

[Configuration]

The digital twin system according to the present exemplary embodiment is configured in such a manner that a robot control system including a control server 20 and a robot 30, and a digital twin server 10 are connected via a network N as illustrated in FIG. 1. The control server 20 is one example of a target system in the real world. The digital twin server 10 observes and models this target system to reproduce it in a digital space.

The digital twin server 10 functions to probabilistically analyze the state of the target system in the digital space and reproduce it as probability distribution data, and generate a model approximating this probability distribution data. Then, the digital twin server 10 provides the generated model to the control server 20, which is the target system in the real world, and the robot as the probability distribution data by transferring the data via the network N. Due to that, the target system side, i.e., the control server 20 can control the robot 30 using the provided model. Note that FIG. 1 illustrates the robot control system as one example of the target system in the real world, but the target system in the real world may be any system. In the following description, the present exemplary embodiment will be described mainly focusing on the configuration of the digital twin server 10, especially, the configuration for generating the model approximating the probability distribution data and transferring the data.

The digital twin server 10 is configured of one or a plurality of information processing apparatus(es) each including an arithmetic device and a storage device. Then, the digital twin server 10 includes a communication condition acquisition unit 11, a mixture number determination unit 12, a model generation unit 13, and a data transfer unit 14, as illustrated in FIG. 2. Each of the functions of the communication condition acquisition unit 11, the mixture number determination unit 12, the model generation unit 13, and the data transfer unit 14 can be realized through execution of a program for realizing each of the functions that is stored in the storage device by the arithmetic device. Further, the digital twin server 10 includes a threshold value storage unit 16. The threshold value storage unit 16 is configured of the storage device. Hereinafter, each configuration will be described in detail.

The communication condition acquisition unit 11 (an acquisition unit) acquires the communication condition of the network connected to, for example, the control server 20, which is the target system. More specifically, the communication condition acquisition unit 11 acquires a communication band indicating the communication condition of the communication route N leading to the control server 20 that becomes the destination to which the probability distribution data approximated by the model as will be described below is provided. Note that the communication condition acquisition unit 11 may acquire the communication band of the communication route N leading to the control server 20 by measuring it, or may acquire the communication band of the communication route N measured by another communication apparatus set up in the network. Note that the communication condition acquisition unit 11 may acquire a characteristic value indicating the communication condition different from the communication band as the communication condition of the communication route N.

The mixture number determination unit 12 (a determination unit) estimates a data amount by which data can be transferred via the communication route N leading to the control server 20 based on the acquired communication band of the communication route N leading to the control server 20. Then, the mixture number determination unit 12 determines a mixture number of Gaussian distributions when a Gaussian mixture model as a mixture of a plurality of Gaussian distributions approximating the probability distribution data is generated as will be described below based on the estimated data amount. Especially, in the present exemplary embodiment, the mixture number determination unit 12 determines a maximum value of the mixture number. Note that, in the Gaussian mixture model, an increase in the mixture number of mixed Gaussian distributions results in an increase in the data amount. Therefore, the mixture number determination unit 12 estimates a greater data amount by which data can be transferred as the communication band increases, and determines a larger maximum value of the mixture number according to an increase in the estimated data amount by which data can be transferred. More specifically, the mixture number determination unit 12 determines the maximum value of the mixture number based on a calculation equation preset so as to calculate a larger maximum value of the mixture number as the communication band increases as described above. Note that the mixture number determination unit 12 may determine one mixture number that has a larger value as the communication band increases.

The model generation unit 13 (a generation unit and the determination unit) generates the Gaussian mixture model approximating the probability distribution data by mixing the plurality of Gaussian distributions based on the maximum value of the mixture number determined as described above. More specifically, the model generation unit 13 sets the mixture number of Gaussian distributions to a predetermined value equal to or smaller than the maximum value, and generates the Gaussian mixture model approximating the probability distribution data using the same number of Gaussian distributions as the set mixture number. Then, the model generation unit 13 evaluates a degree of approximation between the generated Gaussian mixture model and the probability distribution data. For example, the model generation unit 13 calculates a Kullback-Leibler divergence (KLD) between the generated Gaussian mixture model and the probability distribution data. Note that the KLD is a value indicating a distance between two distributions, i.e., the Gaussian mixture model and the probability distribution data, and indicates that the Gaussian mixture model more closely approximates the probability distribution data as the value of the KLD reduces. Then, the model generation unit 13 compares the calculated KLD and a threshold value stored in advance in the threshold value storage unit 16, and checks whether the KLD is smaller than the threshold value. At this time, the threshold value is set to an allowable value as the degree of approximation between the Gaussian mixture model and the probability distribution data, i.e., a value based on which the Gaussian mixture model and the probability distribution data can be determined to be sufficiently approximated by each other. This means that, if the calculated KLD is smaller than the threshold value, the generated Gaussian mixture model can be evaluated to sufficiently approximate the probability distribution data.

Then, the model generation unit 13 determines a final mixture number based on the result of the evaluation of the Gaussian mixture model. More specifically, if the KLD of the generated Gaussian mixture model is smaller than the threshold value, the model generation unit 13 determines that this mixture number is the final mixture number. Then, the model generation unit 13 sets the Gaussian mixture model generated according to the determined final mixture number as the transfer data to be provided to the control server 20 as the probability distribution data.

On the other hand, if the KLD of the generated Gaussian mixture model is equal to or larger than the threshold value, the model generation unit 13 determines that the degree of approximation of the generated Gaussian mixture model is not sufficient, and changes the mixture number of Gaussian distributions and generates a new Gaussian mixture model. At this time, the value of the KLD is expected to reduce as the mixture number increases, and therefore the model generation unit 13, for example, increments the mixture number to a larger value one by one from a preset initial value that is a sufficient small value (for example, "1") and generates the Gaussian mixture model and evaluates the value of the KLD in the above-described manner each time. Then, when the KLD falls below the threshold value, the model generation unit 13 determines that the mixture number at this time is the final mixture number as described above. If the mixture number reaches the maximum value although the KLD remains equal to or larger than the threshold value, the model generation unit 13 determines that the maximum value is the final mixture number. In this case, the model generation unit 13 also sets the Gaussian mixture model generated according to the determined final mixture number as the transfer data to be provided to the control server 20 as the probability distribution data.

Note that, if one mixture number is already determined by the above-described mixture number determination unit 12, the model generation unit 13 determines that this mixture number is the final mixture number. Then, the model generation unit 13 determines that the Gaussian mixture model generated according to the determined final mixture number is the transfer data to be provided to the control server 20 as the probability distribution data.

The above-described mixture number determination unit 12 and model generation unit 13 may determine the mixture number of Gaussian distributions each time the communication condition of the communication route N such as the communication band is acquired. In other words, if the communication condition of the communication route N varies as time passes, the digital twin server 10 may acquire the communication condition by the above-described communication condition acquisition unit 11 at a predetermined time interval or at an arbitrary timing, determine the maximum number of the mixture number according to the acquired latest communication condition, and determine the final mixture number in the above-described manner within this maximum number.

The data transfer unit 14 (a transfer unit) transfers the Gaussian mixture model set as the transfer data as described above to the control server 20 (an external apparatus) via the communication route N. At this time, the data transfer unit 14 transfers an "identifier indicating that this data is the Gaussian mixture model", the "mixture number", and "parameters of each Gaussian distribution used as the basis" to the control server 20 as information for identifying the Gaussian mixture model. In other words, the data amount of the data transmitted from the data transfer unit 14 is mainly constituted by these kinds of data. Note that the parameters of each Gaussian distribution (it, u, a) are "it: a mixture weight", "μ: a mean", and "a: a variance".

Now, the processing by the above-described model generation unit 13 will be described using equations.

First, as the outline of the processing by the model generation unit 13, the model generation unit 13 approximates probability distribution data p(x) by a Gaussian mixture model constructed by mixing K Gaussian distributions N as indicated by an equation 1. At this time, the model generation unit 13 determines a mixture number K that allows a KLD ($D_{KL}$) between the probability distribution data and the Gaussian mixture model to be minimized, i.e., fall below the threshold value as indicated by an equation 2, and sets parameters including, for example, the parameters of the Gaussian distributions used as the bases of the Gaussian mixture model generated according to this mixture number K as the transfer data.

$$p(x) \simeq \hat{p}(x; \pi, \mu, \sigma) = \sum_{k=1}^{K} \pi_k \mathcal{N}(x; \mu_k, \sigma_k^2) \left( \sum_{k=1}^{K} \pi_k = 1 \right) \quad \text{[Equation 1]}$$

$$D_{KL}(p(x) \,\|\, \hat{p}(x)) = \int p(x) \log \frac{p(x)}{q(x)} dx \rightarrow \min \quad \text{[Equation 2]}$$

Next, a fitting algorithm executed by the model generation unit 13, which approximates the probability distribution data p(x) by the Gaussian mixture model constructed by mixing the K Gaussian distributions N, will be described. Note that an EM algorithm is assumed to be used in the present example.

First, the mixture weights and the parameters of the plurality of Gaussian distributions to be mixed are initialized. An equation 3 is one example of the initialization.

$$\pi_k = \frac{1}{K},\ \mu_k \sim U(0,1),\ \sigma_k = 1\ (k = 1, 2, \ldots, K) \quad \text{[Equation 3]}$$

Subsequently, as an E-step, a responsibility ($r_{nk}$) is calculated as indicated by an equation 4 and a likelihood Q is calculated as indicated by an equation 5.

$$r_{nk} = \frac{\pi_k \mathcal{N}(x_n; \mu_k, \sigma_k^2)}{\sum_{k=1}^{K} \pi_k \mathcal{N}(x_n; \mu_k, \sigma_k^2)}\ (k = 1, 2, \ldots, N) \quad \text{[Equation 4]}$$

$$\mathcal{N}(x_n; \mu_k, \sigma_k^2) = \frac{1}{\sqrt{2\pi}\,\sigma_k} \exp\left[ -\frac{(x_n - \mu_k)^2}{2\sigma_k^2} \right]$$

$$Q = \int \left[ \sum_{k=1}^{K} r_{nk} \left\{ -\log\sigma_k + \frac{(x_n - \mu_k)^2}{2\sigma_k^2} \right\} \right] p(x) dx \quad \text{[Equation 5]}$$

In this equation, assume that $\int[\cdot]p(x)dx$ represents a numerical integral using $\{(x_{n,p}(x_n)$ Then, the E-step is ended when an increase in the above-described likelihood Q is lower than a threshold value set for the fitting.

After that, as an M-step, the mixture number K and the parameters of the Gaussian distribution N (π, μ, and σ) are updated as indicated by the following equation 6.

$$N_k = \int r_{nk} p(x) dx,\ \mu_k = \frac{1}{N_k} r_{nk} x p(x) dx \qquad \text{[Equation 6]}$$

$$\pi_k = \frac{N_k}{\Sigma_{k=1}^{K} N_k},\ \sigma_k^2 = \frac{1}{N_k} r_{nk} (x - \mu_k)^2 p(x) dx$$

In this equation, assume that $\int[\cdot]p(x)dx$ represents a numerical integral using $\{(x_{n,p}(x_n))$ The above-described E-step and M-step are repeated the same number of times as the number of bases.

Note that the processing by the model generation unit 13 has been described in the above description citing the example in which the model generation unit 13 approximates the probability distribution data by the Gaussian mixture model constructed by mixing the plurality of Gaussian distributions used as the bases, but the plurality of mixed distributions used as the bases is not limited to the Gaussian distributions and known distributions such as exponential distributions may be used. In other words, the model generation unit 13 may generate a mixture model approximating the probability distribution data by mixing a plurality of known distributions. At this time, the known distributions used as the bases are distributions having known parameters, which are constants characterizing the probability distribution. This means that the data transfer unit 14 puts the parameters of the distributions used as the bases of the mixture model approximating the probability distribution data in the transfer data.

[Operation]

Next, the operation of the above-described digital twin server 10 will be described with reference to a flowchart illustrated in FIG. 3.

First, the digital twin server 10 acquires the communication band as the communication condition of the communication route N connected to, for example, the control server 20, which is the target system (step S1). Then, the digital twin server 10 estimates the data amount by which data can be transferred via this communication route N based on the communication band of the communication route N, and further determines the maximum value of the mixture number of Gaussian distributions based on the estimated data amount (step S2). At this time, the digital twin server 10 estimates a greater data amount by which data can be transferred as the communication band increases, and determines a larger maximum value of the mixture number according to an increase in the estimated data amount by which data can be transferred.

Subsequently, the digital twin server 10 sets the initial value, which is a smaller value than the maximum value, as the mixture number of Gaussian distributions, and generates the Gaussian mixture model approximating the probability distribution data using the same number of Gaussian distributions as this mixture number (step S3). Then, the digital twin server 10 evaluates the degree of approximation between the generated Gaussian mixture model and the probability distribution data. For example, the digital twin server 10 calculates the Kullback-Leibler divergence (KLD) between the generated Gaussian mixture model and the probability distribution data, and checks whether the KLD is smaller than the threshold value (step S4). If the KLD of the Gaussian mixture model is smaller than the threshold value (YES in step S4), the digital twin server 10 transfers this Gaussian mixture model to the control server 20 as the probability distribution data (step S7). At this time, the digital twin server 10 transfers the "identifier indicating that this data is the Gaussian mixture model", the "mixture number", and the "parameters of each Gaussian distribution used as the basis" to the control server 20 as the transfer data.

If the KLD of the generated Gaussian mixture model is equal to or larger than the threshold value (NO in step S4), the digital twin server 10 checks whether the mixture number matches the maximum value (step S5). At this time, if the mixture number in the Gaussian mixture model matches the maximum value (YES in step S5), the digital twin server 10 transfers this Gaussian mixture model to the control server 20 as the probability distribution data as described above (step S7).

If the KLD of the generated Gaussian mixture model is equal to or larger than the threshold value (NO in step S4) and the mixture number does not match the maximum value (NO in step S5), the digital twin server 10 generates a new Gaussian mixture model while changing the mixture number of Gaussian distributions to be mixed after that. More specifically, the digital twin server 10 increments the mixture number by, for example, adding "+1" thereto (step S6), and generates the Gaussian mixture model (step S3) and evaluates the value of the KLD (step S4) in the above-described manner again. Then, until the KLD falls below the threshold value (YES in step S4) or the mixture number reaches the maximum value (YES in step S5), the digital twin server 10 repeats the processing that generates and evaluates a new Gaussian mixture model while changing the mixture number of Gaussian distributions to be mixed in the above-described manner (steps S6, S3, S4, and S5). Then, if the KLD of the generated Gaussian mixture model falls below the threshold value (YES in step S4) or if the mixture number matches the maximum value (YES in step S5), the digital twin server 10 transfers this Gaussian mixture model to the control server as the probability distribution data in the above-described manner (step S7).

Note that the digital twin server 10 may acquire the communication condition of the communication route N such as the communication band at a predetermined time interval or at a preset timing (step S1), and repeat the above-described processing according to this communication band each time the communication condition is acquired (steps S2 to S7). In other words, the digital twin server 10 may determine the maximum value of the mixture number of Gaussian distributions each time the communication condition is acquired, determine the mixture number so as to increase the degree of approximation of the Gaussian mixture model within this maximum value, and transfer the data of the Gaussian mixture model corresponding to this mixture number.

In this manner, the digital twin server 10 according to the present exemplary embodiment acquires the communication condition of the communication route, determines the mixture number according to the communication condition, and generates the mixture model approximating the probability distribution data by mixing the same number of distributions as this mixture number. Therefore, the digital twin server 10 can achieve a reliable data transfer while improving the approximation accuracy of the mixture model. Especially, in the present exemplary embodiment, the digital twin server 10 sets the maximum value of the mixture number that meets the data amount by which the mixture model can be communicated, evaluates the mixture model generated while changing the mixture number within the maximum value, and determines the mixture number based on the result of the evaluation. Therefore, the digital twin server 10 can achieve a reliable data transfer while further improving the approximation accuracy of the mixture model.

Second Exemplary Embodiment

Figure 4:
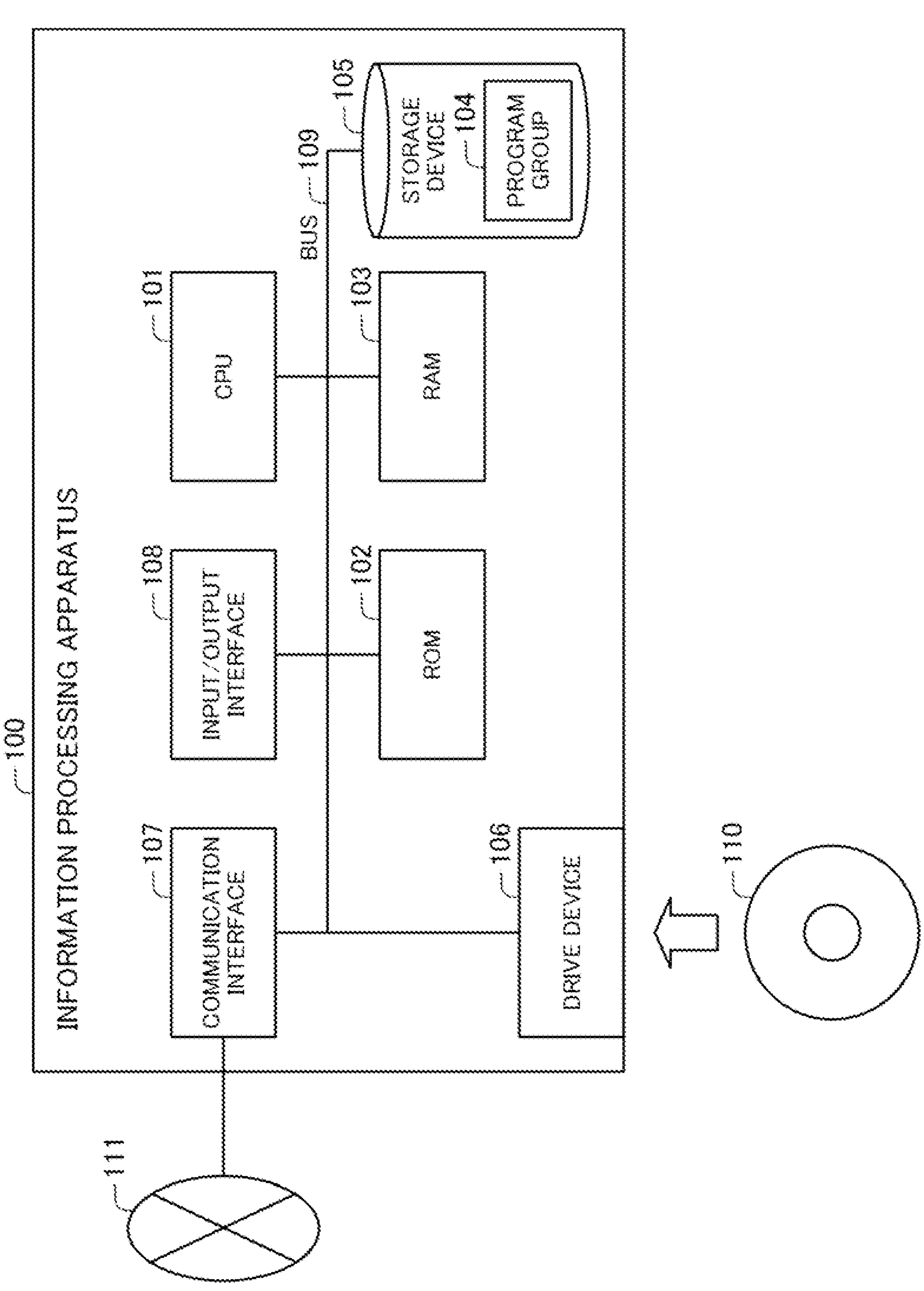
FIG. 4 is a block diagram illustrating the hardware configuration of an information processing apparatus according to a second exemplary embodiment of the present disclosure.
Figure 5:
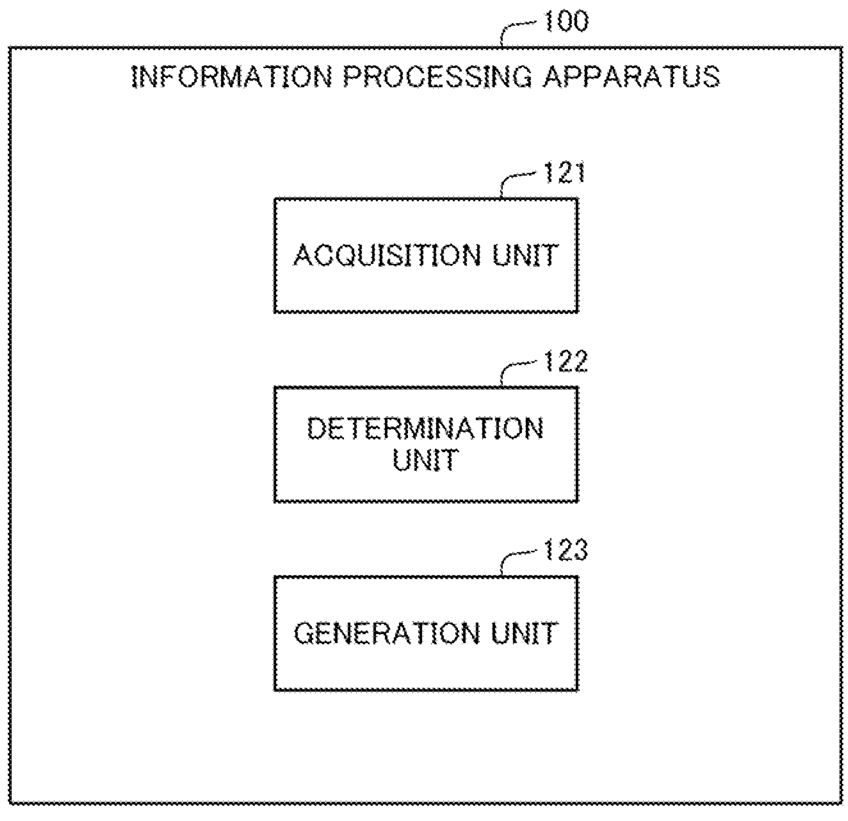
FIG. 5 is a block diagram illustrating the configuration of the information processing apparatus according to the second exemplary embodiment of the present disclosure.

Next, a second exemplary embodiment of the present disclosure will be described with reference to FIGS. 4 and 5. FIGS. 4 and 5 are block diagrams illustrating the configuration of an information processing apparatus according to the second exemplary embodiment. Note that the present exemplary embodiment indicates the outline of the configuration of the information processing apparatus described in the above-described exemplary embodiment.

First, the hardware configuration of an information processing apparatus 100 according to the present exemplary embodiment will be described with reference to FIG. 4. The information processing apparatus 100 is configured of a typical information processing apparatus, and has the following hardware configuration as one example.

CPU (Central Processing Unit) 101 (arithmetic device)
ROM (Read Only Memory) 102 (storage device)
RAM (Random Access Memory) 103 (storage device)
Program group 104 that is loaded into the RAM 103
Storage device 105 storing therein the program group 104
Drive device 106 in charge of reading from and writing into a storage medium 110 outside the information processing apparatus
Communication interface 107 connected to a communication network 111 outside the information processing apparatus
Input/output interface 108 that inputs and outputs data
Bus 109 connecting each constituent element Note that FIG. 4 illustrates one example of the hardware configuration of the information processing apparatus that is the information processing apparatus 100, and the hardware configuration of the information processing apparatus is not limited to the above-described example. For example, the information processing apparatus may be configured of a part of the above-described configuration, such as a configuration not including the drive device 106. Further, the information processing apparatus can use a GPU (Graphic Processing Unit), a DSP (Digital Signal Processor), an MPU (Micro Processing Unit), an FPU (Floating point number Processing Unit), a PPU (Physics Processing Unit), a TPU (Tensor Processing Unit), a quantum processor, or a micro controller, or a combination thereof, instead of the above-described CPU.

Then, the information processing apparatus 100 can construct and include an acquisition unit 121, a determination unit 122, and a generation unit 123 illustrated in FIG. 5 through acquisition of the program group 104 by the CPU 101 and execution of the program 104 by this CPU 101. Note that the program group 104 is, for example, stored in the storage device 105 or the ROM 102 in advance, and is loaded into the RAM 103 and executed by the CPU 101 as needed. Alternatively, the program group 104 may be supplied to the CPU 101 via the communication network 111, or may be stored in the storage medium 110 in advance and be read out and supplied to the CPU 101 by the drive device 106. However, the above-described acquisition unit 121, determination unit 122, and generation unit 123 may be constructed by electronic circuits designed specifically for realizing these units.

The above-described acquisition unit 121 acquires a communication condition of a communication route leading to a provision destination to which probability distribution data is provided. For example, the acquisition unit 121 acquires a communication band of the communication route.

The above-described determination unit 122 determines a mixture number of a plurality of known distributions to be used when the probability distribution data is approximated based on the communication condition. For example, the determination unit determines a maximum value of the mixture number that allows a mixture model to be generated with a data amount communicable via the communication route, and determines the mixture number according to an evaluation of the mixture model generated within the maximum value.

The above-described generation unit 123 generates a mixture model approximating the probability distribution data by mixing the same number of distributions as the determined mixture number. At this time, if the maximum value of the mixture number is set, the generation unit 123 generates and evaluates the mixture model while changing the mixture number within the maximum value, and generates the mixture model corresponding to the mixture number determined according to the result of the evaluation.

By being configured in this manner, the present disclosure determines the mixture number according to the communication condition of the communication route, and generates the mixture model approximating the probability distribution data by mixing the same number of distributions as this mixture number. Therefore, the present disclosure can achieve a reliable data transfer while improving the approximation accuracy of the mixture model.

Note that the above-described program can be stored using various types of non-transitory computer readable media and supplied to a computer. The non-transitory computer readable media include various types of tangible storage media. Examples of the non-transitory computer readable media include a magnetic recording medium (for example, a flexible disk, a magnetic tape, and a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)). Alternatively, the program may also be supplied to the computer via various types of transitory computer readable media. Examples of the transitory computer readable media include electric signals, optical signals, and electromagnetic waves. The transitory computer readable media can supply the program to the computer via a wired communication channel such as an electric wire and an optical fiber, or a wireless communication channel.

Having described the present disclosure with reference to the above-described exemplary embodiments and the like, the present disclosure is not limited to the above-described exemplary embodiments. The form and details of the present disclosure can be changed within the scope of the present disclosure in various manners that can be understood by those skilled in the art. Further, at least one or more function(s) among the functions of the above-described acquisition unit 121, determination unit 122, and generation unit 123 may be executed by an information processing apparatus set up at any location in a network and connected therefrom, i.e., may be executed by so-called cloud computing.

<Supplementary Notes>

A part or whole of the above-described exemplary embodiments can also be described as, but not limited to, the following supplementary notes. Hereinafter, outlines of the configurations of an information processing apparatus, an information processing method, and a program according to the present disclosure will be described. However, the present disclosure is not limited to the following configurations.

(Supplementary Note 1)

An information processing apparatus comprising:

an acquisition unit configured to acquire a communication condition of a communication route leading to a provision destination to which probability distribution data is provided;

a determination unit configured to determine a mixture number of a plurality of known distributions to be used when the probability distribution data is approximated based on the communication condition; and a generation unit configured to generate a mixture model approximating the probability distribution data by mixing the distributions according to the determined mixture number.

(Supplementary Note 2)

The information processing apparatus according to supplementary note 1, wherein the acquisition unit acquires a communication band of the communication route as the communication condition, and the determination unit determines the mixture number based on the communication band.

(Supplementary Note 3)

The information processing apparatus according to supplementary note 2, wherein the determination unit determines the mixture number so as to generate the mixture model having a data amount communicable via the communication band.

(Supplementary Note 4)

The information processing apparatus according to supplementary note 1, wherein the determination unit sets a maximum value of the mixture number based on the communication condition, the generation unit generates the mixture model while changing the mixture number within the maximum value and also evaluates the mixture model generated each time the mixture number is changed, and further, the determination unit determines the mixture number based on a result of the evaluation of the mixture model.

(Supplementary Note 5)

The information processing apparatus according to supplementary note 4, wherein the generation unit evaluates a degree of approximation of the mixture model generated while changing the mixture number within the maximum value to the probability distribution data, and the determination unit determines the mixture number based on the degree of approximation of the mixture model to the probability distribution data.

(Supplementary Note 6)

The information processing apparatus according to supplementary note 5, wherein the generation unit generates the mixture model while changing the mixture number so as to increase it within the maximum value and also calculates a Kullback-Leibler divergence as the degree of approximation of the mixture model generated each time the mixture number is changed to the probability distribution data, and the determination unit determines to use the mixture number acquired when the Kullback-Leibler divergence falls below a preset threshold value.

(Supplementary Note 7)

The information processing apparatus according to supplementary note 1, further comprising:

a transfer unit configured to transfer the generated mixture model to an external apparatus via the communication route.

(Supplementary Note 8)

The information processing apparatus according to supplementary note 1, wherein each time the communication condition is acquired, the determination unit determines the mixture number based on this communication condition.

(Supplementary Note 9)

An information processing method comprising:

acquiring a communication condition of a communication route leading to a provision destination to which probability distribution data is provided;

determining a mixture number of a plurality of known distributions to be used when the probability distribution data is approximated based on the communication condition; and generating a mixture model approximating the probability distribution data by mixing the distributions according to the determined mixture number.

(Supplementary Note 10)

The information processing method according to supplementary note 9, comprising:

acquiring a communication band of the communication route as the communication condition; and determining the mixture number based on the communication band.

(Supplementary Note 11)

The information processing method according to supplementary note 10, comprising:

determining the mixture number so as to generate the mixture model having a data amount communicable via the communication band.

(Supplementary Note 12)

The information processing method according to supplementary note 9, comprising:

setting a maximum value of the mixture number based on the communication condition;

generating the mixture model while changing the mixture number within the maximum value and also evaluating the mixture model generated each time the mixture number is changed; and determining the mixture number based on a result of the evaluation of the mixture model.

(Supplementary Note 13)

The information processing method according to supplementary note 12, comprising:

evaluating a degree of approximation of the mixture model generated while changing the mixture number within the maximum value to the probability distribution data; and determining the mixture number based on the degree of approximation of the mixture model to the probability distribution data.

(Supplementary Note 14)

The information processing method according to supplementary note 13, comprising:

generating the mixture model while changing the mixture number so as to increase it within the maximum value and also calculating a Kullback-Leibler divergence as the degree of approximation of the mixture model generated each time the mixture number is changed to the probability distribution data; and determining to use the mixture number acquired when the Kullback-Leibler divergence falls below a preset threshold value.

(Supplementary Note 15)

The information processing method according to supplementary note 9, comprising:

transferring the generated mixture model to an external apparatus via the communication route.

(Supplementary Note 16)

The information processing method according to supplementary note 9, comprising:

each time the communication condition is acquired, determining the mixture number based on this communication condition.

(Supplementary Note 17)

A program comprising instructions for causing a computer to execute processing to:

acquire a communication condition of a communication route leading to a provision destination to which probability distribution data is provided;

determine a mixture number of a plurality of known distributions to be used when the probability distribution data is approximated based on the communication condition; and generate a mixture model approximating the probability distribution data by mixing the distributions according to the determined mixture number.

REFERENCE SIGNS LIST

10 digital twin server
11 communication condition acquisition unit
12 mixture number determination unit
13 model generation unit
14 data transfer unit
16 threshold value storage unit
20 control server
300 robot
100 information processing apparatus
101 CPU
102 ROM
103 RAM
104 program group
105 storage device
106 drive device
107 communication interface
108 input/output interface
19 bus
110 storage medium
111 communication network
121 acquisition unit
122 determination unit
123 generation unit

The invention claimed is:

1. An information processing apparatus comprising:

at least one memory configured to store processing instructions; and at least one processor configured to execute the processing instructions to:

acquire a communication condition of a communication route leading to a provision destination to which probability distribution data is provided;

determine a mixture number of a plurality of known distributions to be used when the probability distribution data is approximated based on the communication condition;

generate a mixture model approximating the probability distribution data by mixing the plurality of known distributions according to the determined mixture number, determine the mixture number so as to generate the mixture model having a data amount communicable via a communication band, and transfer the generated mixture model to a control server via the communication route, wherein the generated mixture model is used by the control server to control a robot.

2. The information processing apparatus according to claim 1, wherein the at least one processor configured to execute the processing instructions to:

acquire the communication band of the communication route as the communication condition; and determine the mixture number based on the communication band.

3. The information processing apparatus according to claim 1, wherein the at least one processor configured to execute the processing instructions to:

set a maximum value of the mixture number based on the communication condition;

generate the mixture model while changing the mixture number within the maximum value and perform an evaluation of the mixture model generated each time the mixture number is changed; and determine the mixture number based on a result of the evaluation of the mixture model.

4. The information processing apparatus according to claim 3, wherein the at least one processor configured to execute the processing instructions to:

evaluate a degree of approximation of the mixture model generated while changing the mixture number within the maximum value to the probability distribution data; and determine the mixture number based on the degree of approximation of the mixture model to the probability distribution data.

5. The information processing apparatus according to claim 4, wherein the at least one processor configured to execute the processing instructions to:

generate the mixture model while changing the mixture number so as to increase it within the maximum value and also calculate a Kullback-Leibler divergence as the degree of approximation of the mixture model generated each time the mixture number is changed to the probability distribution data; and determine to use the mixture number acquired when the Kullback-Leibler divergence falls below a preset threshold value.

6. The information processing apparatus according to claim 1, wherein the at least one processor configured to execute the processing instructions to:

each time the communication condition is acquired, determine the mixture number based on the communication condition.

7. An information processing method performed by an information processing apparatus, comprising:

acquiring, by the information processing apparatus, a communication condition of a communication route leading to a provision destination to which probability distribution data is provided;

determining, by the information processing apparatus, a mixture number of a plurality of known distributions to be used when the probability distribution data is approximated based on the communication condition;

generating, by the information processing apparatus, a mixture model approximating the probability distribution data by mixing the plurality of known distributions according to the determined mixture number;

determining, by the information processing apparatus, the mixture number so as to generate the mixture model having a data amount communicable via a communication band;

transferring, by the information processing apparatus, the generated mixture model to a control server via the communication route; and controlling, by the control server, a robot using the generated mixture model.

8. The information processing method according to claim 7, comprising:

acquiring the communication band of the communication route as the communication condition; and determining the mixture number based on the communication band.

9. The information processing method according to claim 7, comprising:

setting a maximum value of the mixture number based on the communication condition;

generating the mixture model while changing the mixture number within the maximum value and performing an evaluation of the mixture model generated each time the mixture number is changed; and determining the mixture number based on a result of the evaluation of the mixture model.

10. The information processing method according to claim 9, comprising:

evaluating a degree of approximation of the mixture model generated while changing the mixture number within the maximum value to the probability distribution data; and determining the mixture number based on the degree of approximation of the mixture model to the probability distribution data.

11. The information processing method according to claim 10, comprising:

generating the mixture model while changing the mixture number so as to increase it within the maximum value and also calculating a Kullback-Leibler divergence as the degree of approximation of the mixture model generated each time the mixture number is changed to the probability distribution data; and determining to use the mixture number acquired when the Kullback-Leibler divergence falls below a preset threshold value.

12. The information processing method according to claim 7, comprising:

transferring the generated mixture model to an external apparatus via the communication route.

13. The information processing method according to claim 7, comprising:

each time the communication condition is acquired, determining the mixture number based on the communication condition.

14. A non-transitory computer-readable storage medium storing therein a program comprising instructions for causing a computer to execute processing to:

acquire a communication condition of a communication route leading to a provision destination to which probability distribution data is provided;

determine a mixture number of a plurality of known distributions to be used when the probability distribution data is approximated based on the communication condition; and generate a mixture model approximating the probability distribution data by mixing the plurality of known distributions according to the determined mixture number, determine the mixture number so as to generate the mixture model having a data amount communicable via a communication band, and transfer the generated mixture model to a control server via the communication route, wherein the generated mixture model is used by the control server to control a robot.

* * * * *